US007003088B1

(12) United States Patent
Cope et al.

(10) Patent No.: US 7,003,088 B1
(45) Date of Patent: Feb. 21, 2006

(54) KEY TO CORRELATE A CALL WITH CALL-HANDLING INFORMATION

(75) Inventors: Warren B. Cope, Olathe, KS (US); Rangarajan Ramaswami, Belmont, CA (US)

(73) Assignee: Sprint Communications Company L.P., Overland Park, KS (US)

(*) Notice: Subject to any disclaimer, the term of this patent is extended or adjusted under 35 U.S.C. 154(b) by 500 days.

(21) Appl. No.: 10/192,942

(22) Filed: Jul. 11, 2002

(51) Int. Cl.
*H04M 3/00* (2006.01)

(52) U.S. Cl. .................. 379/221.14; 455/417
(58) Field of Classification Search ............... 455/417; 379/265.01–265.14, 233, 216.01, 221.08–221.09, 379/266.01–266.1
See application file for complete search history.

(56) References Cited

U.S. PATENT DOCUMENTS

| | | |
|---|---|---|
| 5,418,844 A | 5/1995 | Morrisey et al. |
| 5,448,633 A | 9/1995 | Jamaleddin et al. |
| 5,524,146 A | 6/1996 | Morrisey et al. |
| 5,566,235 A | 10/1996 | Hetz |
| 5,572,583 A | 11/1996 | Wheeler, Jr. et al. |
| 5,590,187 A | 12/1996 | Greenspan |
| 5,675,635 A | 10/1997 | Vos et al. |
| 5,684,866 A | 11/1997 | Florindi et al. |
| 5,694,463 A | 12/1997 | Christie et al. |
| 5,793,853 A | 8/1998 | Sbisa |
| 5,825,780 A | 10/1998 | Christie |
| 5,828,740 A | 10/1998 | Khuc et al. |
| 5,864,614 A | 1/1999 | Farris et al. |
| 5,920,562 A | 7/1999 | Christie et al. |
| 5,923,745 A | 7/1999 | Hurd |
| 5,926,538 A | 7/1999 | Deryugin et al. |
| 5,933,486 A | 8/1999 | Norby et al. |
| 5,949,869 A | 9/1999 | Sink et al. |
| 5,987,118 A | 11/1999 | Dickerman et al. |
| 5,993,486 A | 11/1999 | Tomatsu |
| 6,075,855 A | 6/2000 | Christiansen et al. |
| 6,097,803 A | 8/2000 | Sbisa |
| 6,148,069 A | 11/2000 | Ekstrom et al. |
| 6,215,864 B1 | 4/2001 | Goyal et al. |
| 6,262,992 B1 | 7/2001 | Nelson et al. |
| 6,470,081 B1 | 10/2002 | Sbisa et al. |
| 6,529,504 B1 | 3/2003 | Sbisa |
| 6,567,659 B1 | 5/2003 | Sbisa |

(Continued)

FOREIGN PATENT DOCUMENTS

DE 199 54 224 A 1 5/2001

(Continued)

OTHER PUBLICATIONS

Dehni, Tarek, et al., "Intelligent Networks and the HP OpenCall Technology," Aug. 1997 Hewlett-Packard Journal, Article 6, XP-002259853, pp. 1-14.

(Continued)

*Primary Examiner*—Fan Tsang
*Assistant Examiner*—Ming Chow

(57) ABSTRACT

A communication system processes a set-up message for a call to transfer a query message to a network call processor that processes the query message to transfer an inquiry message to a remote call processor. The remote call processor processes the inquiry message to select a key and transfers the key to the network call processor. The remote call processor transfers the key and call-handling information for the call to a destination system. The network call processor transfers the key to the communication system. The communication system transfers the key and the call to the destination system. The destination system associates the call with the call-handling information based on the key.

14 Claims, 7 Drawing Sheets

U.S. PATENT DOCUMENTS

| | | |
|---|---|---|
| 6,574,319 B1 | 6/2003 | Latter et al. |
| 6,603,851 B1 | 8/2003 | Smith et al. |
| 6,611,590 B1 | 8/2003 | Lu et al. |
| 6,690,656 B1 | 2/2004 | Christie et al. |
| 6,801,520 B1 * | 10/2004 | Philonenko ................ 370/351 |
| 2003/0169870 A1 * | 9/2003 | Stanford ................ 379/265.12 |
| 2004/0032864 A1 | 2/2004 | Sbisa et al. |

FOREIGN PATENT DOCUMENTS

| | | |
|---|---|---|
| EP | 0 631 477 A2 | 12/1994 |
| EP | 0 901 297 A2 | 3/1999 |
| WO | WO 99/35859 | 7/1999 |
| WO | WO 00/42782 | 7/2000 |

OTHER PUBLICATIONS

Briere, Daniel, "Sprint plans sweeping Network Revisions," Network World, Sep. 20, 1993, Network World, Inc.
U.S. Appl. No. 09/345,936, filed Jul. 1, 1999.
U.S. Appl. No. 10/047,341, filed Jan. 15, 2002.
U.S. Appl. No. 10/047,298, filed Jan. 15, 2002.
U.S. Appl. No. 10/356,863, filed Feb. 3, 2003.
U.S. Appl. No. 10/277,377, filed Oct. 22, 2002.
U.S. Appl. No. 10/403,160, filed Mar. 31, 2003.
U.S. Appl. No. 10/436,625, filed May 13, 2003.
U.S. Appl. No. 10/642,863, filed Aug. 18, 2003.
U.S. Appl. No. 10/835,040, filed Apr. 29, 2004.

* cited by examiner

KEY TO CORRELATE A CALL WITH CALL-HANDLING INFORMATION

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communications, and in particular, to the use of a key from a remote call processor to correlate call-handling information with a call.

2. Description of the Prior Art

Call center operations receive large volumes of calls. Examples of call center operations are airline reservation and customer service operations, mail-order operations, and telephone promotion operations. A call center operation controls the routing of incoming calls to the proper call center destination. The call center operation also provides the system or operator that answers the call with pertinent call-handling information.

For example, the telephone network may collect a account code from the caller and deliver the account code to the call center operation during call set-up. If the account code indicates a preferred customer, then the call center operation may have the call routed to a highly-skilled operator who is provided with the caller's name and current account information. In this way, a skilled operator may answer a call from a preferred customers with the customer's actual name and with current account information ready to quickly assist the preferred customer.

An existing technique for correlating call-handling information with an incoming call is described in detail below with respect to FIGS. 1–3. The existing technique requires the call center operation to use Dialed Number Information Service (DNIS) and Automatic Number Identification (ANI) to correlate calls with call-handling information. Unfortunately, to obtain the proper DNIS for a call, the call center operation must provide a route code for the call that corresponds to both the selected destination for the call and the proper DNIS for the call. Thus, the route code performs a dual role—correlation to both a route and DNIS digits. As discussed below, this dual role places a complex correlation burden on both the call center operation and the telecommunication network. Due to existing switching system configurations, this dual role also causes call blocking in certain situations.

SUMMARY OF THE INVENTION

The invention helps solve the above problems with a key to correlate a call with its call-handling information. Advantageously, the route code from the remote processor no longer has the dual role of identifying both a destination and DNIS digits because the key can be passed as the DNIS digits and the route code can be used for routing. The use of the key radically simplifies the complex correlations required by existing systems. The use of the key also reduces or eliminates the call blocking based on switching system table entry limitations. Examples of the invention include telecommunication networks, call center operations, their subsystems, and methods of operating telecommunication networks, call center operations, and their subsystems. The invention may include software products for telecommunication networks, call center operations.

Some examples of the invention include telecommunication network that comprises a communication system and a network call processor. The communication system is configured to process a set-up message for a call to transfer a query message. The network call processor is configured to process the query message to transfer an inquiry message to a remote call processor, receive a first response message including a key selected by the remote call processor responsive to the inquiry message, and process the first response message to transfer a second response message including the key. The communication system is configured to process the second response message to transfer the key and call communications to a destination system.

In some examples of the invention, the remote call processor is configured to transfer the key and call-handling information to the destination system. The destination system is configured to associate the call with the call-handling information based on the key.

In some examples of the invention, the communication system is configured to collect caller-entered data for the call and transfer the caller-entered data to the network call processor. The network call processor is configured to transfer the caller-entered data to the remote call processor in the inquiry message. The remote call processor is configured to include the caller-entered data in the call-handling information.

In some examples of the invention, the network call processor comprises a service control point and the remote call processor comprises a remote processor at a call center operation.

In some examples of the invention, the first response message includes a route code. The network call processor is configured to process the route code to identify a table and a table entry in the second response message. The communication system is configured to enter the table with the table entry to identify a route, and to transfer the key and the call communications to the destination system over the route.

In some examples of the invention, the route comprises a switch and trunk and the communication system is configured to transfer the key and the call communications from the switch over the trunk to the destination system.

In some examples of the invention, the network call processor is configured to overwrite a portion of the table entry with the key in the second response message.

Some examples of the invention include a telecommunication call center operation for handling a call from a telecommunication network. The telecommunication call center operation comprises a remote call processor and a destination system. The remote call processor is configured to receive an inquiry message from the telecommunication network for the call, process the inquiry message to select a key, transfer the key to the telecommunication network, and transfer the key and call-handling information for the call. The destination system configured to receive the key and the call-handling information from the remote call processor, receive the key and the call from the telecommunication network, and associate the call with the call-handling information based on the key.

In some examples of the invention, the remote call processor is configured to process the inquiry message to select a route code and transfer the route code to the telecommunication network. The telecommunication network routes the call to the destination system based on the route code.

In some examples of the invention, the call-handling information indicates an interactive program for a voice response unit, a script for an operator, a caller identity, or caller-entered data transferred to the call center operation by the telecommunication network.

BRIEF DESCRIPTION OF THE DRAWINGS

The same reference number represents the same element on all drawings.

DETAILED DESCRIPTION OF THE PREFERRED EMBODIMENT

Figure 1:
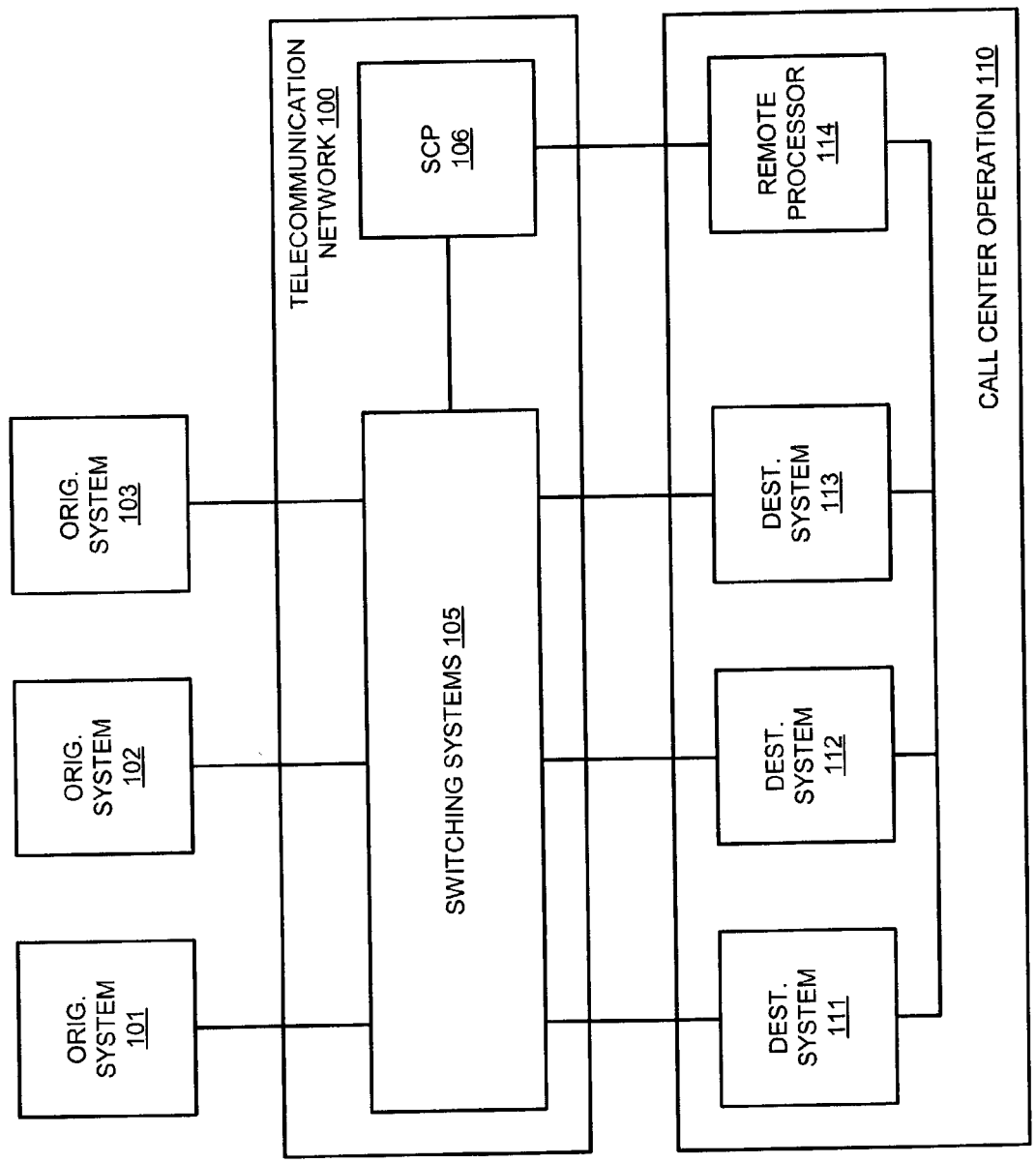
FIG. 1 illustrates a telecommunication network and a call center operation in an example of the prior art.
Figure 2:
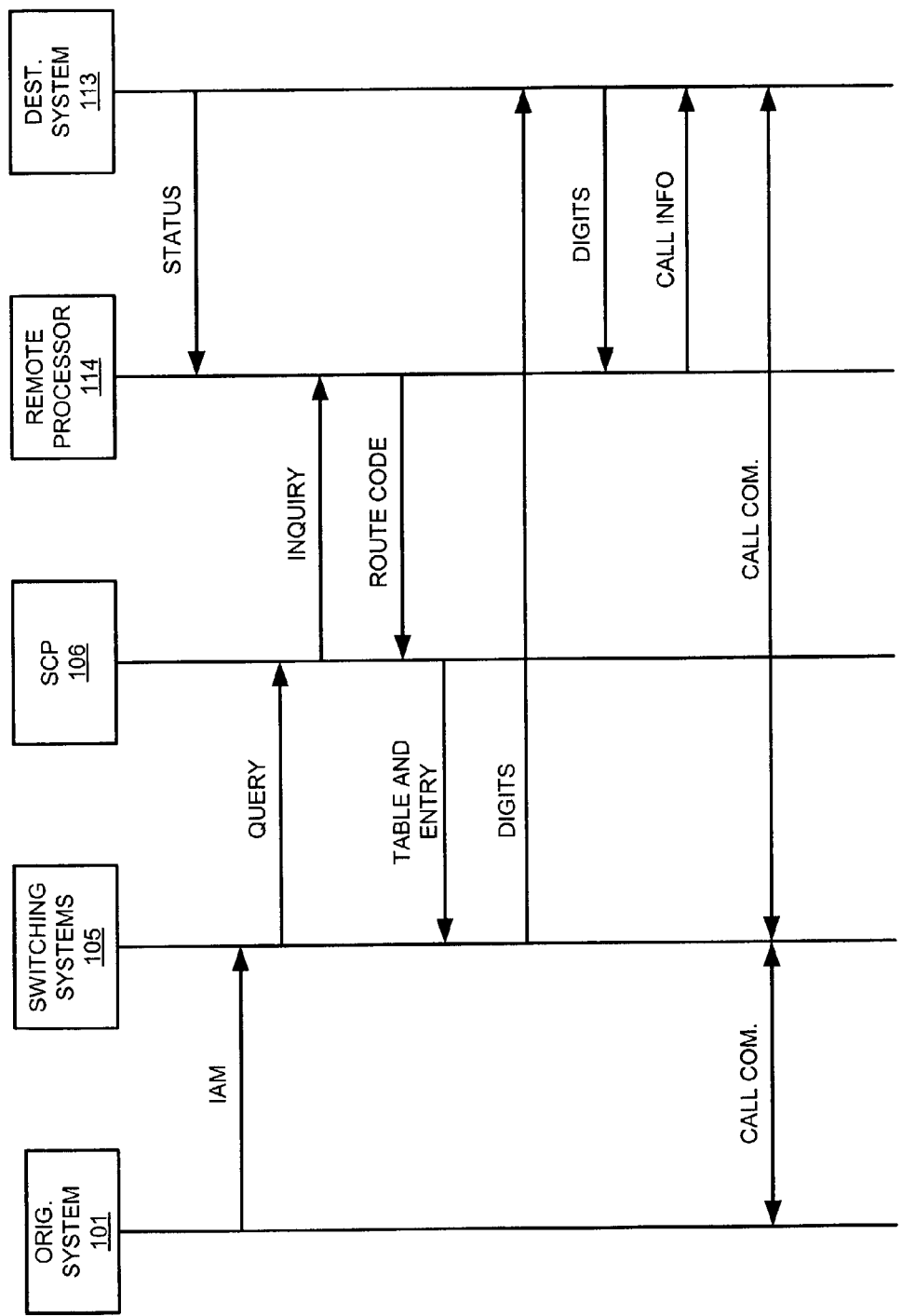
FIG. 2 illustrates the operation of a telecommunication network and a call center operation in an example of the prior art.
Figure 3:
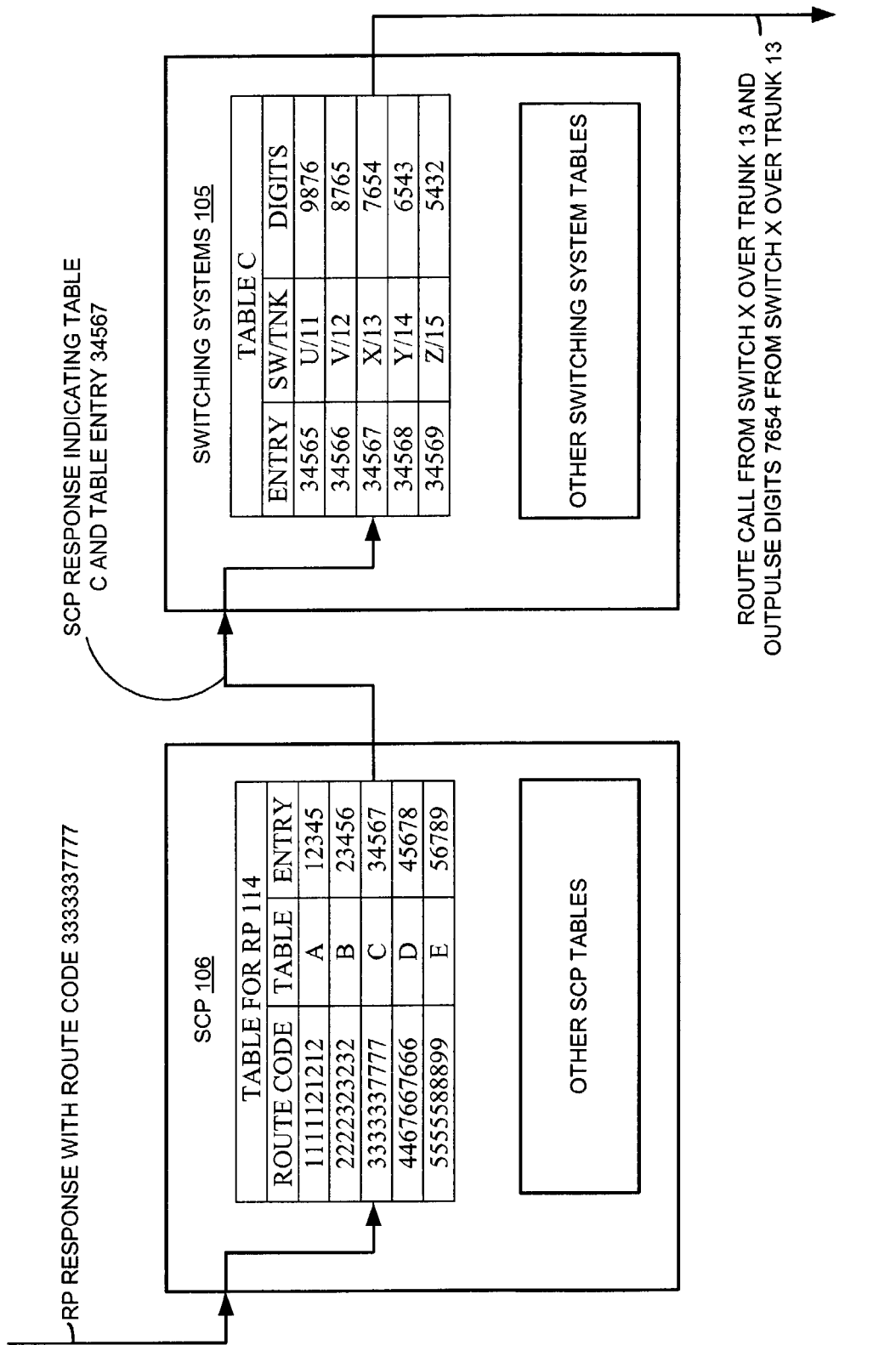
FIG. 3 illustrates telecommunication call processing in an example of the prior art.

Existing Telecommunication Network and Call Center Operation—FIGS. 1–3

Prior to a discussion of the invention, a more detailed description of existing telecommunication networks and call center operations is presented to provide a better understanding of the invention as described further below. FIG. 1 illustrates telecommunication network 100 and call center operation 110 in an example of the prior art. Telecommunication network 100 includes switching systems 105 and Service Control Point (SCP) 106 that are linked together. Call center operation 110 includes destination systems 111–113 and Remote Processor (RP) 114 that are linked together. Switching systems 105 are linked to origination systems 101–103 and to destination systems 111–113. SCP 106 is linked to RP 114.

Origination systems 101–103 are caller systems and communication networks that access telecommunication network 100. The origination and destination systems are dispersed across a large geographic area, and there are more origination and destination systems than that shown, but the number has been restricted for clarity. Switching systems 105 could be an interconnected group of DMS-250 switches from Nortel Networks. SCP 106 could be the Himalaya from Compac. RP 114 could be the ICM from Cisco Systems.

FIG. 2 illustrates the operation of telecommunication network 100 and call center operation 110 in an example of the prior art. At the top right, destination system 113 transfers status information to RP 114 to indicate operator and resource availability. Similar status information is transferred by the other destination systems to indicate operator and resource availability across call center operation 110.

At the top left, origination system 101 transfers a Signaling System #7 (SS7) Initial Address Message (IAM) indicating a called toll-free number and other information to switching systems 105. Switching systems 105 receive and process the IAM to generate and transfer an SS7 Transaction Capability Application Part (TCAP) query to SCP 106. SCP 106 receives and processes the TCAP query to generate and transfer an RP inquiry to RP 114. The message processing and transfer described above from switching systems 105 to SCP 106 to RP 114 is triggered by the called toll-free number.

RP 114 receives and processes the RP inquiry based on operator and resource availability to generate and transfer an RP response indicating a route code. SCP 106 receives and processes the RP response to generate and transfer a TCAP response indicating a table and a table entry. Switching systems 105 receive and process the TCAP response to identify a terminating switch/trunk and DNIS digits for the telephone call.

Switching systems 105 establish a call path from origination system 01 to destination system 113 over the terminating switch/trunk. Switching systems 105 outpulse the DNIS and ANI digits to destination system 113 over the call path. Destination system 113 receives and processes the outpulsed digits to generate and transfer a request to RP 114 indicating the outpulsed digits. RP 114 receives and processes the request to generate and transfer call-handling information for the call to destination system 113. Thus, RP 114 must correlate the DNIS and ANI for the incoming call with the proper call-handling information. Switching systems 105 exchange call communications between origination system 101 and destination system 113 over the call path.

The call-handling information may identify the caller. The call-handling information may identify a script an operator to use when answering the call or an interactive program for a voice response unit to run when answering the call. The call-handling information may include data collected from the caller by telecommunication system 100 and transferred to call center operation 110—for example in the RP inquiry. Examples of caller-entered information include account codes and menu selections. The call-handling information may include caller account information.

FIG. 3 illustrates telecommunication call processing in an example of the prior art. Note that for clarity, the tables on FIG. 3 are highly simplified and use dummy entries. As indicated above, SCP 106 receives the RP response that indicates a route code—route code "3333337777" in this example. SCP 106 enters a table for RP 114 with route code "333337777" to yield switch table "C" and table entry "34567". SCP 106 transfers the TCAP response that indicates switch table "C" and table entry "34567" to switching systems 105. Switching systems 105 enter switch table "C" with table entry "34567" to yield switch/trunk "X/13" and outpulse digits "7654". Switching systems 105 then outpulse the digits "7654" from switch "X" over trunk "13". Switching systems 105 also route the call from switch "X" over trunk "13" to destination system 113.

As noted in the Background section above, each toll-free number is limited to 192 table entries. Each of these table entries must be pre-assigned to a given combination of switch/trunk and outpulse digits. If call center operation has four sites, then each site has 48 table entries. If each site has 4 departments (i.e.—generic customer service, preferred customer service, generic product ordering, and special product ordering), then each department at each site has only 12 table entries. Since the table entries are allocated to incoming calls, a given department at a given site can only queue 12 callers before they run out of table entries to allocate. After 12 callers in queue, switching systems 105 begin to block calls to the department. Call blocking to call center operation 110 can have serious negative consequences—especially during a mass calling event or promotion.

In addition to potential call blocking, there must be proper correlations between the toll-free numbers, route codes, switch tables, table entries, switch/trunks, and outpulse digits. Since these correlations start at RP 114, call center operation 110 is burdened with a complex correlation task to manage incoming calls. Since destination system 113 uses the outpulse digits to request information about the call from RP 114, RP 114 must also be configured to correlate call-handling information with the outpulse digits. Telecommunication network 100 must deal with implementing the complex correlation scheme.

New Telecommunication Network and Remote Call Processor—FIGS. 4–7

FIGS. 4–7 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 4:
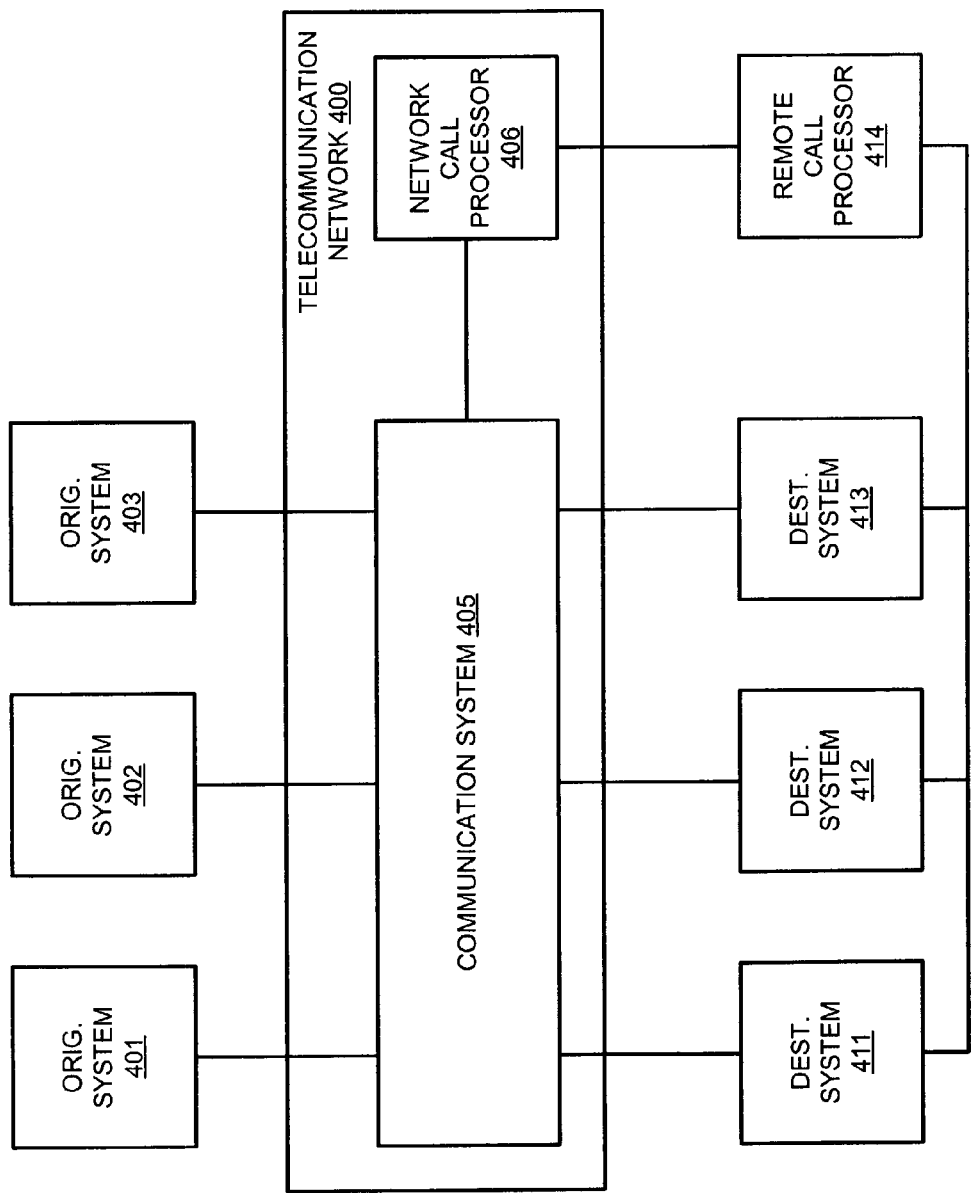
FIG. 4 illustrates a telecommunication network and a remote call processor in an example of the invention.

FIG. 4 illustrates telecommunication network 400 and remote call processor 414 in an example of the invention. Telecommunication network 400 includes communication system 405 and network call processor 406 that are linked together. Communication system 405 is linked to origination systems 401–403 and to destination systems 411–413. Network call processor 406 is linked to remote call processor 414. Remote call processor 414 is linked to destination systems 411–413.

Origination systems 401–403 are caller systems and communication networks that access telecommunication network 400. The origination and destination systems may be dispersed across a large geographic area, and there may be more origination and destination systems than that shown, but the number has been restricted for clarity.

Communication system 405 could be an interconnected group of telecommunication switches, such as the DMS-250 from Nortel Networks. Alternatively, communication system 105 could use routers, gateways, other types of switches, and other communication equipment. Network call processor 106 could be an SCP, such as the Himalaya from Compac. Remote call processor could be an RP, such as the ICM from Cisco Systems. In some examples of the invention, destination systems 411–413 and remote call processor 414 could comprise a call center operation. In some examples of the invention, remote call processor 414 could be hosted by telecommunication network 400.

Figure 5:
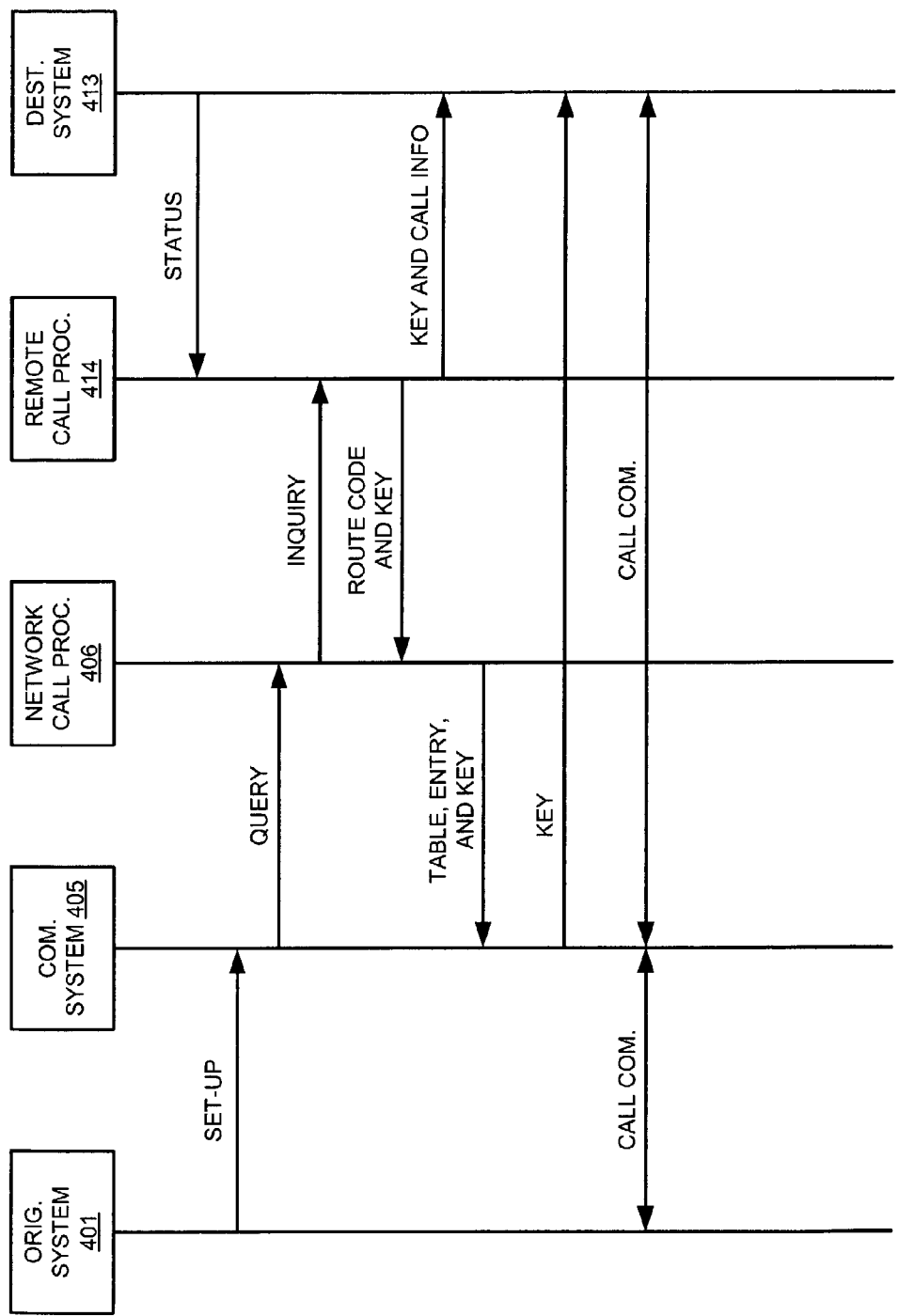
FIG. 5 illustrates the operation of a telecommunication network and a remote call processor in an example of the invention.

FIG. 5 illustrates the operation of telecommunication network 400 and remote call processor 414 in an example of the invention. At the top right, destination system 413 transfers status information to remote call processor 414. The status information may indicate operator and resource availability. Similar status information is transferred by the other destination systems.

At the top left, origination system 401 transfers a first message to communication system 405. The first message could be an SS7 IAM or some other type of call-set-up signal. The first message may indicate a called number and other information, and the called number could be a toll-free number. Communication system 405 receives and processes the first message to generate and transfer a second message to network call processor 406. The second message could be an SS7 TCAP or some other type of query signal. Network call processor 406 receives and processes the second message to generate and transfer a third message to remote call processor 414. The third message could be an RP inquiry or some other type of query signal. The message processing and transfer described above from communication system 405 to network call processor 406 to remote call processor 414 may be triggered by a called toll-free number.

Remote call processor 414 receives and processes the third message based on the destination status information to generate and transfer a fourth message indicating a route code and a key. The fourth message could be an RP response or some other type of response signal. Remote call processor 414 also generates and transfers a fifth message indicating the key and information about the call to destination system 413.

Network call processor 406 receives and processes the fourth message to generate and transfer a sixth message indicating a switch table, table entry, and the key. The sixth message could be a TCAP response or some other type of response signal. Communication system 405 receives and processes the sixth message to identify a route for the call. The route could be a switch/trunk or some other type of route information, such as a packet address or optical connection.

Communication system 405 establishes a call path from origination system 401 to destination system 413 over the route. Communication system 405 transfers the key to destination system 413—possibly by outpulsing digits over the call path. Destination system 413 receives and processes the key from communication system 405 to correlate the call communications with the call-handling information. Communication system 405 exchanges call communications between origination system 401 and destination system 413 over the call path.

The call-handling information may identify the caller. The call-handling information may identify a script for an operator to use when answering the call or an interactive program for a voice response unit to run when answering the call. The call-handling information may include data collected from the caller by telecommunication system 100 and transferred to call center operation 110—for example in the RP inquiry. Examples of caller-entered information include account codes and menu selections. The call-handling information may include caller account information. For example, a financial account code could be collected from the caller and transferred from network call processor 406 to remote call processor 414. Remote call processor 414 would transfer the financial account code and the key to destination system 413. Destination system 413 may use the account code to retrieve caller identity and account information When destination system 413 subsequently receives the call, it can associate the call with the caller identity and account information based on the key.

Figure 6:
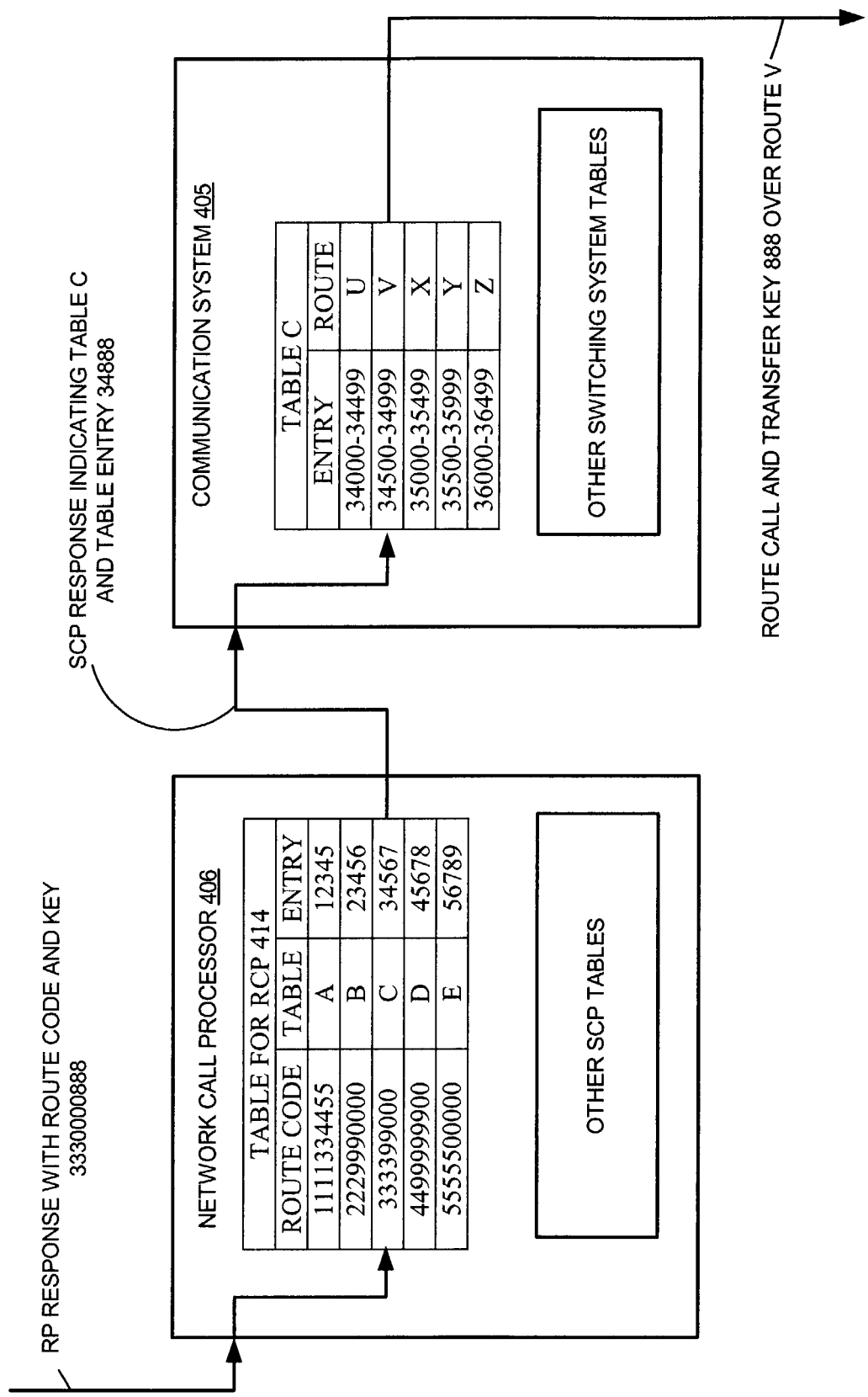
FIG. 6 illustrates telecommunication call processing in an example of the invention.

FIG. 6 illustrates telecommunication call processing in an example of the invention. Note that for clarity, the tables on FIG. 6 are highly simplified and use dummy entries. As indicated above, network call processor 406 receives the RP response that indicates a route code and a key. The route code and key are combined into a route label—"3330000888" in this example. Network call processor 406 first attempts an exact match of the route label, and if found, processing proceeds as above for FIG. 3 to provide backward compatibility with existing systems.

If the exact match is not found, then network call processor 406 identifies the number of route code digits in the beginning of the route label. The number of route code digits may be specified on a per called number basis. In this example there are three route code digits at the beginning of the route label, and thus, the route code is "333XXXXXXX" where the Xs mask the other digits. Network call processor 406 enters a table for remote call processor 414 with the masked route code "333XXXXXXX" to yield table "C" and entry "34567".

Network call processor 406 then reconfigures the entry yield as follows. Network call processor 406 counts the number of right-most zeros in the matching table entry for the route code to identify the number of digits in the key. In this example, there are three right-most zeroes in the matching table entry "3339999000", so their are three digits at the end of the route label that make-up the key—"888". Network call processor 406 uses the key from the end of the route label to overwrite the corresponding number of digits at the end of the entry yield. In this example, network call processor 406 overwrites the three digits at the end of the entry yield "34567" with the key "888" to get "34888" as the reconfigured entry. Network call processor 406 transfers the response to communication system 405 that indicates table "C" and entry/key "34888". The response may indicate the number of digits at the end of the table entry that comprise the key.

Communication system 405 enters table "C" with "34888" to yield route "V". Note that the table entries now use ranges to accommodate insertion of the key in the entry. Communication system 405 then obtains the key from the end of the entry and transfers the key over route "V" to destination system 413. Thus, communication system 405 transfers "888" over route "V" to destination system 413. In some examples, route "V" could be a switch/trunk.

Figure 7:
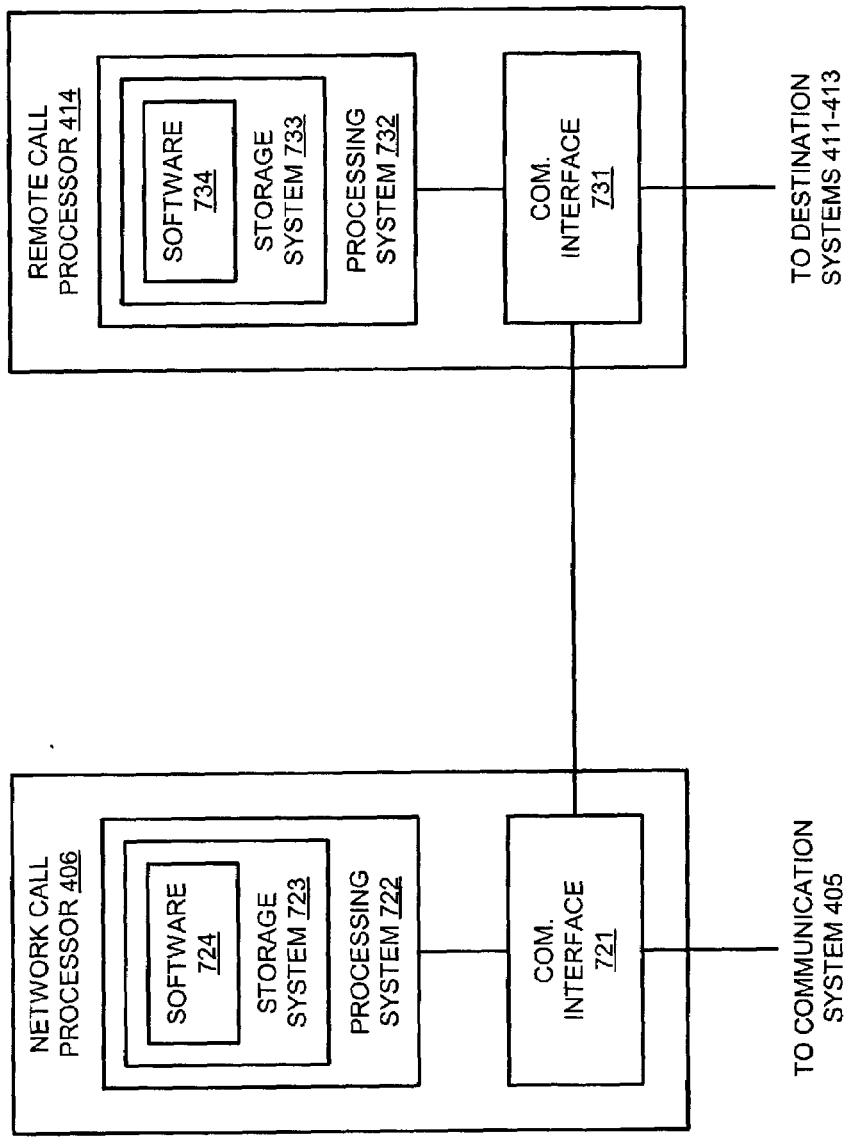
FIG. 7 illustrates a network call processor and a remote call processor in an example of the invention.

FIG. 7 illustrates network call processor 406 and remote call processor 414 in an example of the invention. Network call processor 406 includes communication interface 721 and processing system 722. Processing system 722 includes storage system 723. Storage system 723 includes software 724. Communication interface 721 and processing system 722 are linked together. Communication interface 721 is linked to communication system 405. Network call processor 406 could be comprised of programmed general-purpose computer and conventional communications equipment, although those skilled in the art will appreciate that programmable or special purpose circuitry and equipment may be used. Network call processor 406 may use a client server architecture where operations are distributed among a server system and client devices that together comprise elements 721–724. Based on this disclosure, those skilled in the art will appreciate how to modify and configure existing computer and communication systems to make network call processor 406. Communication interface 721 is configured to receive query messages, transfer inquiry messages, receive response messages, and transfer response messages. Communication interface 721 could be conventional. Processing system 722 could comprise a computer microprocessor, logic circuit, or some other processing devices. Processing system 722 may be distributed among multiple processing devices. Storage system 723 could comprise a disk, tape, integrated circuit, server, or some other memory device. Storage system 723 may be distributed among multiple memory devices. Processing system 722 retrieves and executes software 724 from storage system 723. Software 724 could comprise an application program, firmware, or some other form of machine-readable processing instructions. When executed by processing system 722, software 724 directs processing system 722 to control remote call processor 406 operation as described above.

Remote call processor 414 includes communication interface 731 and processing system 732. Processing system 732 includes storage system 733. Storage system 733 includes software 734. Communication interface 731 and processing system 732 are linked together. Communication interface 731 is linked to communication interface 721 and to destination systems 411–413. Remote call processor 414 could be comprised of programmed general-purpose computer and conventional communications equipment, although those skilled in the art will appreciate that programmable or special purpose circuitry and equipment may be used. Remote call processor 414 may use a client server architecture where operations are distributed among a server system and client devices that together comprise elements 731–734. Based on this disclosure, those skilled in the art will appreciate how to modify and configure existing computer and communication systems to make remote call processor 414. Communication interface 731 is configured to receive inquiry messages and status information and transfer response messages. Communication interface 731 could be conventional. Processing system 732 could comprise a computer microprocessor, logic circuit, or some other processing devices. Processing system 732 may be distributed among multiple processing devices. Storage system 733 could comprise a disk, tape, integrated circuit, server, or some other memory device. Storage system 733 may be distributed among multiple memory devices. Processing system 732 retrieves and executes software 734 from storage system 733. Software 734 could comprise an application program, firmware, or some other form of machine-readable processing instructions. When executed by processing system 732, software 734 directs processing system 732 to control remote call processor 414 operation as described above.

What is claimed is:

1. A telecommunication network comprising:
   a communication system configured to process a set-up message for a call to transfer a query message; and
   a network call processor configured to process the query message to transfer an inquiry message to a remote call processor, to receive a first response message including a route code selected by the remote call processor and including a key selected by the remote call processor responsive to the inquiry message, wherein the route code and the key are separate from one another, to process the route code to identify route information, and to transfer a second response message including the route information and the key; and
   wherein the communication system is configured to process the route information to identify a route and to transfer the key and call communications to a destination system over the route, wherein the destination system is configured to associate the call with call-handling information based on the key.

2. The telecommunication network of claim 1 wherein the remote call processor is configured to transfer the key and the call-handling information to the destination system.

3. The telecommunication system of claim 2 wherein:
the communication system is configured to collect caller-entered data for the call and transfer the caller-entered data to the network call processor;
the network call processor is configured to transfer the caller-entered data to the remote call processor in the inquiry message; and
the remote call processor is configured to include the caller-entered data in the call-handling information.

4. The telecommunication system of claim 2 wherein the network call processor comprises a service control point and the remote call processor comprises a remote processor at a call center operation.

5. The telecommunication network of claim 2 wherein the route information identifies a table and a table entry; and the communication system is configured to enter the table with the table entry to identify the route.

6. The telecommunication system of claim 5 wherein the route comprises a switch and trunk and the communication system is configured to transfer the key and the call communications from the switch over the trunk to the destination system.

7. The telecommunication system of claim 5 wherein the network call processor is configured to overwrite a portion of the table entry with the key in the second response message.

8. A method of operating a telecommunication network, the method comprising:
processing a set-up message for a call in a communication system and transferring a query message from the communication system to a network call processor in response to processing the set-up message;
processing the query message in the network call processor and transferring an inquiry message from the network call processor to a remote call processor in response to processing the query message;
receiving a first response message in the network call processor from the remote call processor wherein the first response message includes a route code selected by the remote call processor and includes a key selected by the remote call processor in response to the inquiry message, wherein the route code and the key are separate from one another;
processing the route code in the network call processor to identify route information and transferring a second response message including the route information and the key from the network call processor to the communication system in response to processing the first response message; and
processing the route information in the communication system to identify a route and transferring the key and call communications from the communication system to a destination system over the route in response to processing the second response message, wherein the destination system associates the call with call-handling information based on the key.

9. The method of claim 8 wherein the remote call processor transfers the key and the call-handling information to the destination system.

10. The method of claim 9 further comprising collecting caller entered data for the call and transferring the caller-entered data to the remote call processor wherein the remote call processor includes the caller-entered data in the call-handling information.

11. The method of claim 9 wherein the network call processor comprises a service control point and the remote call processor comprises a remote processor at a call center operation.

12. The method of claim 9 wherein the
route information identifies a table and a table entry, and wherein identifying the route comprises
entering the table with the table entry to identify the route.

13. The method of claim 12 wherein the route comprises a switch and trunk and wherein transferring the key and the call communications from the communication system to the destination system comprises transferring the key and the call communications from the switch over the trunk to the destination system.

14. The method of claim 12 further comprising overwriting a portion of the table entry with the key.

* * * * *